US009678195B2

(12) United States Patent
Mayer (10) Patent No.: US 9,678,195 B2
(45) Date of Patent: Jun. 13, 2017

(54) METHOD OF PROCESSING POSITIONING SIGNALS IN POSITIONING SYSTEMS TO ACCURATELY DETERMINE A TRUE ARRIVAL TIME OF EACH SIGNAL

(71) Applicant: TAKEMETUIT INC., Kenora (CA)

(72) Inventor: Raymond Mayer, Thunder Bay (CA)

(73) Assignee: TAKEMETUIT INC., Kenora (CA)

( * ) Notice: Subject to any disclaimer, the term of this patent is extended or adjusted under 35 U.S.C. 154(b) by 130 days.

(21) Appl. No.: 14/765,378

(22) PCT Filed: Jan. 31, 2014

(86) PCT No.: PCT/CA2014/050061
§ 371 (c)(1),
(2) Date: Aug. 3, 2015

(87) PCT Pub. No.: WO2014/117273
PCT Pub. Date: Aug. 7, 2014

(65) Prior Publication Data
US 2015/0378003 A1 Dec. 31, 2015

Related U.S. Application Data

(60) Provisional application No. 61/760,456, filed on Feb. 4, 2013.

(51) Int. Cl.
*G01S 5/26* (2006.01)
*G01S 5/18* (2006.01)
*H04W 64/00* (2009.01)

(52) U.S. Cl.
CPC ........ *G01S 5/26* (2013.01); *G01S 5/18* (2013.01); *H04W 64/00* (2013.01)

(58) Field of Classification Search
CPC ............. G01S 5/26; G01S 5/18; H04W 64/00
See application file for complete search history.

(56) References Cited

U.S. PATENT DOCUMENTS 3,824,464 A * 7/1974 Rotier ................ G01S 7/527
327/187
7,558,534 B2 * 7/2009 Stein ................ G01S 5/0205
455/556.1

(Continued)

FOREIGN PATENT DOCUMENTS

CA   WO 2014117273 A1 * 8/2014 ............. G01S 5/26
CA   GB 2525110 B  * 9/2016 ............. G01S 5/26

(Continued)

OTHER PUBLICATIONS

Fang, Bertrand T., Simple Solutions for Hyperbolic and Related Position Fixes, IEEE Transactions on Aerospace and Electronic Systems, 1990, pp. 748-753, vol. 26.

(Continued)

*Primary Examiner* — Daniel Pihulic
(74) *Attorney, Agent, or Firm* — Erise IP, P.A.

(57) ABSTRACT

A method of determining of a true time of arrival of an energy pulse in a positioning system using arrivals times of such pulses at a device after emission of the pulses from respective transmitters. A sampled signal is cross-correlated with the expected form of the energy pulse from the transmitter, and a highest peak in the correlated signal is located and selected to represent a possible time of arrival of the energy pulse. A sequentially preceding peak in the correlated signal is then selected has its magnitude compared with a threshold. This step is repeated until the magnitude of the currently selected peak is less than the threshold, at which point the last-selected peak whose magnitude exceeded the threshold marks the true time of arrival. This process avoids false time of arrival readings caused by reflected pulses.

19 Claims, 6 Drawing Sheets

(56) References Cited

U.S. PATENT DOCUMENTS

| | | | |
|---|---|---|---|
| 8,000,169 B2* | 8/2011 | Touge | G01S 7/521 367/98 |
| 8,059,700 B2 | 11/2011 | Lopez-Risueno et al. | |
| 2003/0087604 A1* | 5/2003 | Stein | G01S 5/0205 455/65 |
| 2005/0003828 A1 | 1/2005 | Sugar et al. | |
| 2009/0075674 A1* | 3/2009 | Qahwash | H04B 17/27 455/456.2 |
| 2009/0149132 A1* | 6/2009 | LeFever | H04B 1/7075 455/67.11 |
| 2009/0316529 A1 | 12/2009 | Huuskonen et al. | |
| 2011/0235466 A1 | 9/2011 | Booij et al. | |
| 2011/0286505 A1* | 11/2011 | Hedley | G01S 5/0205 375/224 |
| 2013/0083631 A1 | 4/2013 | Harrell et al. | |
| 2015/0378003 A1* | 12/2015 | Mayer | G01S 5/26 367/117 |

FOREIGN PATENT DOCUMENTS

| | | |
|---|---|---|
| WO | 0165271 A1 | 9/2001 |
| WO | 2008017032 A2 | 2/2008 |
| WO | 2009143559 A1 | 12/2009 |
| WO | 2013048708 A1 | 4/2013 |

OTHER PUBLICATIONS

Bucher, Ralph and D. Misra, A Synthesizable VHDL Model of the Exact Solution for Three-dimensional Hyberbolic Positioning System, VLSI Design, 2002, pp. 507-520, vol. 15, issue 2.

* cited by examiner

Figure 6:
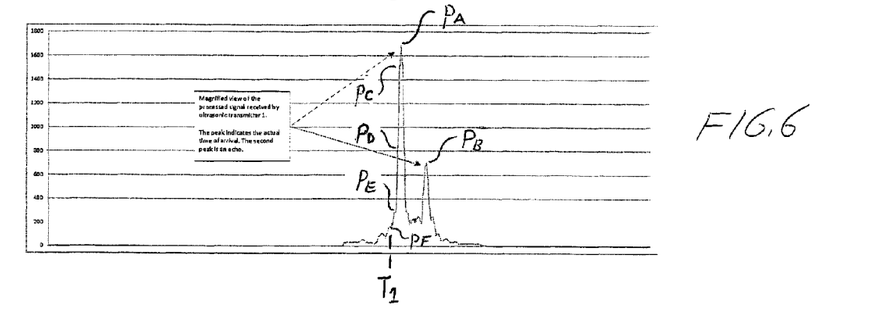
FIG. 6 is partial close up view of the processed signal of FIG. 5, illustrating a series of peaks within the signal, of which two peaks exceed a threshold for qualifying as potential signs of the true time of arrival of the pulse from a respective one of the signal transmitters, one peak marking the actual time of arrival of the pulse and the other marking arrival of an echo or reflection of the pulse.

An audio signal is sampled by the mobile device at a rate of 48 kHz. Periodically, the buffer is checked to determine if enough data exists (1.5 s) to analyze and determine the relative position.

Four ultrasonic transmitters are installed in known positions and emit a linear swept signal (18 kHz to 24 kHz) with a Blackman-Harris envelope.

Each ultrasonic transmitter transmits a signal in its own 250 ms timeslot. Therefore UT0 transmits at t=0, UT1 at t=250 ms, UT2 at t=500 ms, and UT3 at 750 ms. A gap of 750 ms is introduced before UT0 transmits again.

When UT0 (master) transmits, a time compensated network signal is sent to all connected ultrasonic transmitters. Each transmitter has on-board a switch bank that determines its transmitter number (UT0 is number 0, UT1 is number 1, etc.). As each slave transmitter receives the master network signal, it delays a number of 250 ms intervals based on its transmitter number.

When the mobile device receives 1.5 s worth of audio data, it is guaranteed that at least four transmitter signals will be detectable.

METHOD OF PROCESSING POSITIONING SIGNALS IN POSITIONING SYSTEMS TO ACCURATELY DETERMINE A TRUE ARRIVAL TIME OF EACH SIGNAL

RELATED APPLICATIONS

The present application is a national stage application under 35 U.S.C. §371 of International Application No. PCT/CA2014/050061, filed 31 Jan. 2014, and which claims priority from U.S. Provisional Application No. 61/760,456, filed 4 Feb. 2013. The above-referenced applications are hereby incorporated by reference into the present application in their entirety.

FIELD OF THE INVENTION

The present invention relates generally to signal processing in positioning systems in which arrival times of signals transmitted and received between an electronic device and a set of satellites installed at predetermined locations are used to calculate the position of the device, and more particularly to a processing method for distinguishing a true arrival time of each emitted signal from potential false arrival time readings, for example resulting from signal echoes or other interference.

BACKGROUND OF THE INVENTION

A known problem in the field of telecommunications is that techniques useful in outdoor environments for determination the current position or location of a mobile telecommunications device, such as a mobile cellular telephone, are not effective for monitoring the position of the device in indoor environments.

For example, Global Positioning System device have been incorporated into mobile telephones to make use of GPS satellites to determine a phone's position. However, a relatively direct line of site to the satellites is required and the precision of the system is limited, thus making GPS generally unsuitable for positioning purposes in indoor environments.

It has been previously proposed to instead use dedicated systems employing different positioning solutions better suited for indoor environments, including systems where transmission and receipt of acoustic signals between the mobile device and a series of stationary satellites in the indoor environment is used to accurately determine the position of the device within that environment. Such prior art systems often use ultrasonic signals so as to be undetectable to the human ear, and include systems where the mobile device is the signal transmitter and the satellites are the signal receivers, and systems with the reverse configuration where the satellites emit the acoustic signals for detection thereof by the device.

As one example of the latter type, U.S. Patent Application No. 2009/0316529 assigned to Nokia Corporation, the entirety of which is incorporated herein by reference, discloses an acoustical positioning system in which a cellular telephone or other mobile device receives acoustic signals of ultrasonic frequency from a set of loudspeakers arranged to emit audio beacons in a predetermined sequence at predetermined intervals, and uses the time of arrival of the beacons to determine the device's position.

Applicant has developed their own unique system of this general type, in which sampled audio data collected by the microphone of the mobile phone is analyzed to identify sound level peaks in the ultrasonic range for use of those peaks as markers of the arrival of the ultrasonic signals at the phone. In such development, it has been found that inaccuracies in the position determination process can result due to misidentification of a located peak as the arrival time of a respective one of the ultrasonic signals from the transmitters, when in fact the peak in question is the result of a reflection of one of the signals.

Applicant has developed a unique signal processing method to address this complication by distinguishing the true arrival of the signal from such false positives in order to increase the accuracy and reliability of the positioning system.

SUMMARY OF THE INVENTION

According to a first aspect of the invention there is provided a method of processing positioning signals in a positioning system employing a series of signal transmitters arranged at predetermined locations to emit respective energy pulses at predetermined intervals in a predetermined sequence and an electronic device detecting arrival times of said pulses and using said arrival times to determine a position of the electronic device, the method comprising:

(a) obtaining a sampled signal by sampling an incoming signal at the electronic device over a time period at least as long as the sum of the intervals between the energy pulses emitted by the signal transmitters;

(b) determining a correlated signal by correlating the sampled signal with a comparison signal representing a form of the energy pulses expected at the electronic device;

(c) locating and selecting a peak in the correlated signal representing a possible time of arrival of the energy pulse from one of the signal transmitters at the electronic device;

(d) selecting a sequentially preceding peak in the correlated signal as a selected peak, and comparing a magnitude value of the selected peak against a threshold;

(e) repeating step (d) until the magnitude value of the currently selected peak is less than the threshold; and (f) identifying the last one of the selected peaks that had a magnitude value greater than the threshold and using said last one of the selected peaks as an indication of a true time of arrival of the energy pulse from the one of the signal transmitters at the electronic device.

Preferably the method includes additional step (g) of removing a portion of the correlated signal that contains the indication of the true time of arrival from further consideration and then repeating steps (c) to (f) by a number of times at least as great in number as a quantity of signal transmitters in the set minus one, so that a number of the energy pulses for which the true time of arrival was determined is at least as great as the quantity of signal transmitters.

Preferably the peak located in step (c) is a peak of highest magnitude in the signal, and the method further comprises step (h) of sorting the true times of arrival in order of time.

Preferably the method includes additional step (i) of matching each true time of arrival to a respective one of the signal transmitters.

Preferably the signal transmitters are arranged to have a time delay of greater length than each interval in the series before restarting the sequence after emission of the energy pulse from a last signal transmitter in the sequence, and wherein step (i) comprises determining which true time of arrival matches a first one of the signal transmitters by searching for a time gap between a sequential pair of true arrival times that exceeds the length of the time delay, whereby the existence of such a gap acts to identify a later one of the sequential pair of the true times of arrival as a match for the energy pulse of a first signal transmitter in the sequence.

Preferably the method includes using the true times of arrival together with known positional data on the locations of the signal transmitters to calculate a position of the electronic device.

Preferably step (b) further comprises performing an RMS function on the correlated signal prior to step (c) in order to eliminate negative values from the correlated signal.

Preferably the threshold value in step (d) is calculated as a percentage of the magnitude value of the peak selected in step (c).

Each signal transmitter may be an acoustic signal transmitter emitting an acoustic pulse.

Each signal transmitter may be an ultrasonic signal transmitter emitting an ultrasonic pulse.

The transmitters may be installed in an indoor, air-filled environment in which air defines a transmission medium through the energy pulses are conveyed, in which case the electronic device may be a user-carried mobile device, for example a mobile telephone.

Alternatively, the transmitters may be arranged to transmit the energy pulses through a liquid medium in which the electronic device is to be located.

In yet a further alternative, the transmitters may be arranged to transmit the energy pulses through a solid medium.

Preferably step (b) comprises cross-correlating the sampled signal with the comparison signal.

According to a second aspect of the invention there is provided computer readable memory having stored thereon statements and instructions for execution by a processor to perform the method according to any preceding claim when said statements and instructions are executed by the processor.

According to a third aspect of the invention, there is provided a method of processing positioning signals a positioning system employing energy pulses transmitted and received by opposite ones of a series of satellites installed at predetermined locations and an electronic device to be located in order to use detected arrival times of the energy pulse signals for use in determining a position of the electronic device, the method comprising:

(a) obtaining a sampled signal by sampling an incoming signal at either the electronic device or the series of satellites, said incoming signal including arrival of an energy pulse emitted by a transmitter of the other of the electronic device or the series of satellites;

(b) determining a correlated signal by correlating the sampled signal with a comparison signal representing a form of the energy pulse expected from the transmitter;

(c) locating and selecting a peak in the correlated signal representing a possible time of arrival of the energy pulse from the transmitter;

(d) selecting a sequentially preceding peak in the correlated signal as a selected peak, and comparing a magnitude value of the selected peak against a threshold;

(e) repeating step (d) until the magnitude value of the currently selected peak is less than the threshold; and (f) identifying the last one of the selected peaks that had a magnitude value greater than the threshold and using said last one of the selected peaks as an indication of a true time of arrival of the energy pulse from the transmitter.

According to another aspect of the invention there is provided a method of processing positioning signals in a positioning system employing energy pulses transmitted and received by opposite ones of a series of satellites installed at predetermined locations and an electronic device to be located in order to use detected arrival times of the energy pulse signals for use in determining a position of the electronic device, the method comprising:

(a) obtaining a sampled signal by sampling an incoming signal at either the electronic device or the series of satellites, said incoming signal including arrival of an energy pulse emitted by a transmitter of the other of the electronic device or the series of satellites;

(b) determining a correlated signal by correlating the sampled signal with a comparison signal representing a form of the energy pulse expected from the transmitter; and (c) from among a plurality of peaks in the correlated signal each representing a possible time of arrival of the energy pulse from the transmitter, discerning a one of said peaks that represents a true arrival of the energy pulse from the transmitter from another of said peaks that represents arrival of a reflected energy pulse.

Preferably, discerning said one of said peaks from said another of said peaks in step (c) comprises comparing both said one of said peaks, and said another of said peaks, against a threshold.

According to yet another aspect of the invention, there is provided a method of processing positioning signals in a positioning system employing a series of signal transmitters arranged at predetermined locations to emit respective energy pulses and an electronic device detecting arrival times of said pulses for use in determining a position of the electronic device, the method comprising:

(a) obtaining a sampled signal by sampling an incoming signal at the electronic device over a time period;

(b) determining a correlated signal by correlating the sampled signal with a comparison signal representing a form of the energy pulses expected at the electronic device; and (c) locating and selecting a peak in the correlated signal representing a possible time of arrival of the energy pulse from one of the signal transmitters at the electronic device;

(d) from the peak selected in step (c), scanning the correlated signal in a reverse direction of time for sequentially preceding peaks until either (i) a located and selected preceding peak has a magnitude less than a threshold, or (ii) a starting point of a prescribed range of time measured back from the possible time of arrival is reached; and (e) identifying a last-selected threshold-exceeding peak, which has a magnitude value greater than the threshold, as an indication of a true time of arrival of the energy pulse from the one of the signal transmitters at the electronic device.

According to yet a further aspect of the invention, there is provided a method of processing positioning signals in a positioning system employing energy pulses transmitted and received by opposite ones of a series of satellites installed at predetermined locations and an electronic device to be located in order to use detected arrival times of the energy pulse signals for use in determining a position of the electronic device, the method comprising:

(a) obtaining a sampled signal by sampling an incoming signal at either the electronic device or the series of satellites, said incoming signal including arrival of an energy pulse emitted by a transmitter of the other of the electronic device or the series of satellites;

(b) determining a correlated signal by correlating the sampled signal with a comparison signal representing a form of the energy pulse expected from the transmitter;

(c) locating and selecting a peak in the correlated signal representing a possible time of arrival of the energy pulse from the transmitter;

(d) from the peak selected in step (c), scanning the correlated signal in a reverse direction of time for sequentially preceding peaks until either (i) a located and selected preceding peak has a magnitude less than a threshold, or (ii) a starting point of a prescribed range of time measured back from the possible time of arrival is reached; and (e) identifying a last-selected threshold-exceeding peak, which has a magnitude value greater than the threshold, as an indication of a true time of arrival of the energy pulse from the transmitter.

BRIEF DESCRIPTION OF THE DRAWINGS

In the accompanying drawings, which illustrate exemplary embodiments of the present invention.

DETAILED DESCRIPTION

Figure 1:
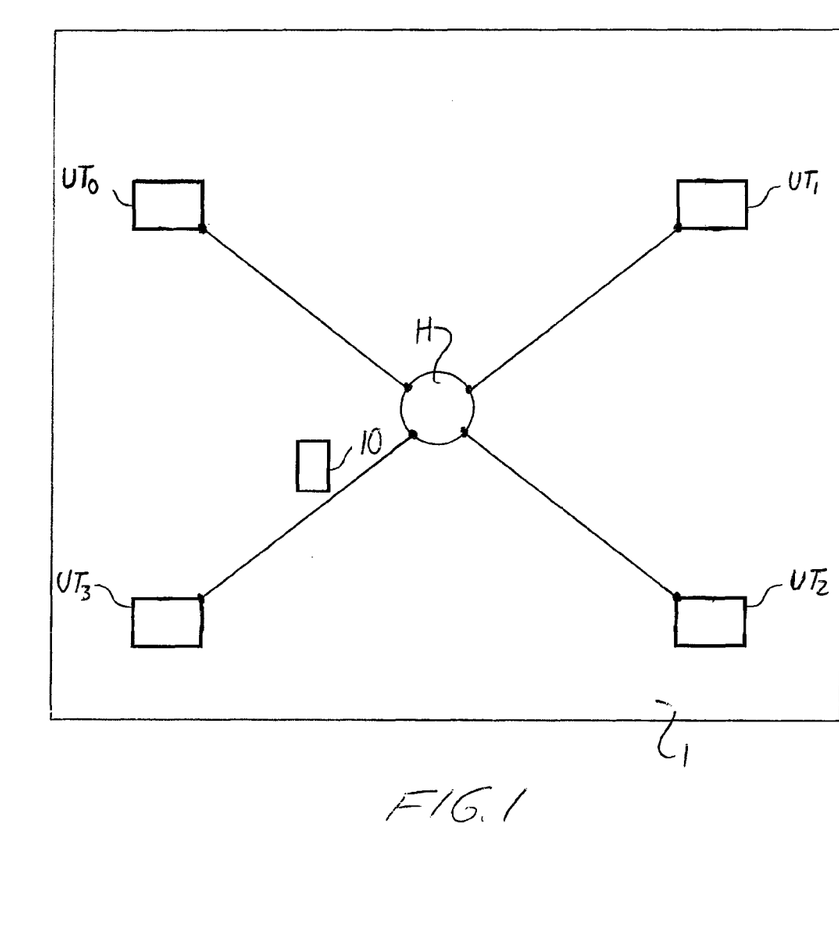
FIG. 1 is a schematic illustration of an indoor positioning system employing a signal processing method of the present invention in determining the position of a mobile device within an indoor environment.

FIG. 1 illustrates a type of indoor positioning system in which a method of the present invention for accurately determining the arrival time of positioning signals can be employed. The system of the illustrated embodiment is an ultrasonic positioning system, in which four networked devices having respective ultrasonic transmitters $UT_0$, $UT_1$, $UT_2$, $UT_3$ are linked together in a network, for example linked together in a star network via a central network hub H. One of the devices may be configured as a master device, to which the other devices are slaves. In the illustrated embodiment, $UT_0$ is the ultrasonic transmitter of the master device. The networked devices are mounted at respective spaced-apart stationary locations within an indoor environment 1 in which the position of a mobile device 10, such as a mobile cellular telephone, is to be tracked or monitored.

Figure 2:
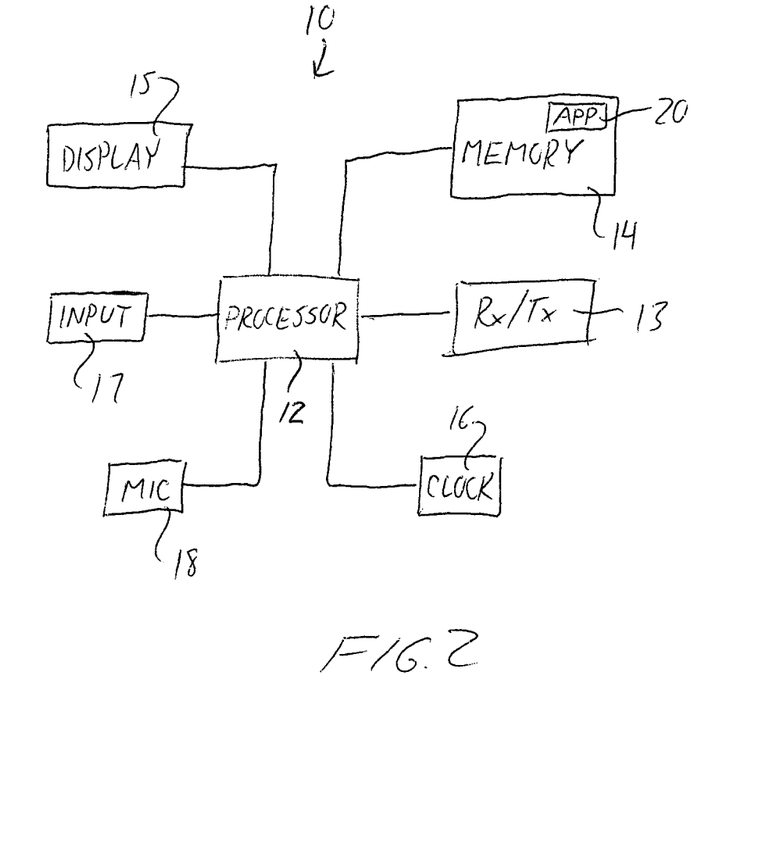
FIG. 2 is a schematic illustration of the mobile device of FIG. 1.

As shown in. FIG. 2, the mobile device includes a processor 12 connected to a computer readable memory 14 for reading and writing of data therefrom and thereto. The processor is connected to a clock 16 which defines a time reference by which the mobile device operates. The mobile device also includes a microphone 18 having a suitable frequency range to be operable to transduce ultrasonic pulses emitted by the ultrasonic transmitters. The schematically illustrated device of FIG. 2 is described above and illustrated in terms of the basic components it requires to operate in the context described herein, but need not be a specialized or dedicated device for such purposes, and thus may include other components for use in other functions. For example, the mobile device may be a mobile cellular telephone, thus additionally having a radio transceiver 13, a display screen 15 and an input device 17, which may be separate from the display screen (e.g. tactile keypad) or incorporated therein (e.g. touchscreen).

The ultrasonic transmitters are configured to emit respective ultrasonic pulses in a sequenced order with a predetermined interval of time I between each two sequential pulses. In one embodiment, based on a prototype of the system, the interval time I is 250 ms.

Figure 3:
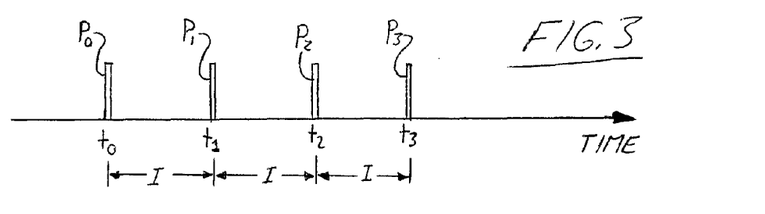
FIG. 3 schematically illustrates the timing of transmission of ultrasonic pulses from signal transmitters of the indoor positioning system.

Referring to FIG. 3, at time $t_0$, the first transmitter $UT_0$ (i.e. the master transmitter) emits its respective ultrasonic pulse $P_0$, and sends a time compensated network signal sent to all other transmitters $UT_1$, $UT_2$, $UT_3$ (i.e. the slave transmitters). Each slave transmitter waits for a predetermined multiple of the interval time, and upon expiry of same, emits its respective ultrasonic pulse. Accordingly, transmitter $UT_1$ waits for a one-count of the interval time I from receipt of the network signal before emitting its pulse $P_1$, transmitter $UT_2$ waits for a two-count of the interval time I from receipt of the network signal before emitting its pulse $P_2$, and transmitter $UT_3$ waits for a three-count of the interval time from receipt of the network signal before emitting its pulse $P_3$. In the present embodiment, considering the emission of the first pulse $P_0$ from transmitter $UT_0$ to mark the start of the sequence at $t_0=0$, $UT_1$ thus transmits its pulse $P_1$ at time $t_1=250$ ms, $UT_2$ transmits its pulse $P_2$ at time $t_2=500$ ms and $UT_3$ transmits its pulse P3 at time $t_3=750$ ms. A delay time of greater length than the interval time, for example 750 ms, is left after the final pulse $P_3$ from the last transmitter $UT_3$ in the series before repeating the sequence. In other words, the total sequence time (the sum of the three intervals I, plus the delay time) is greater than four times the interval time. In the present embodiment, the total sequence time is 1.5 s, which is greater than four times the interval time (1.5 s>4×250 ms=1 s).

Figure 7:
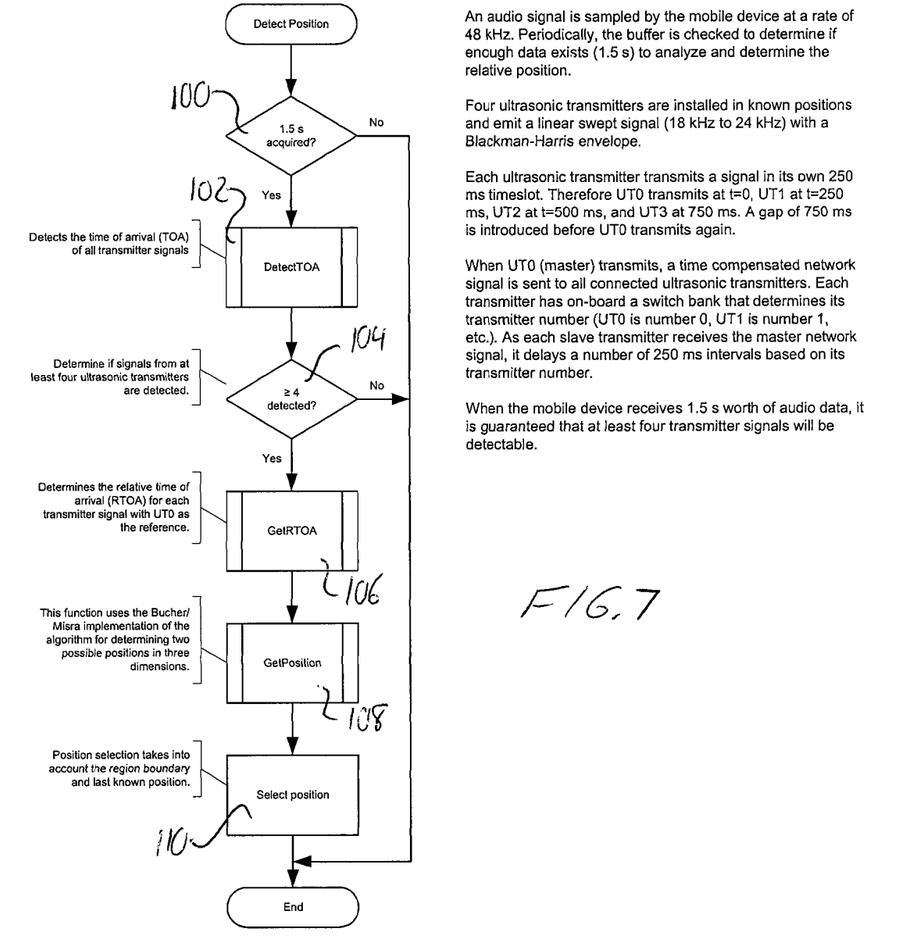
FIG. 7 schematically illustrates a process used by the mobile for determining its position based on the received ultrasonic pulses from the transmitters.

A software application 20 stored on the memory 14 of the mobile device 10 is programmed to continuously sample audio input from the microphone 18 into a buffer, and initiate a 'detect position' routine schematically illustrated in FIG. 7. A first step 100 of the 'detect position' routine starts by performing a check as to whether the buffer contains a sample audio signal at least as long as the total sequence time, i.e. >=1.5 s for the present embodiment. If not, the 'detect position' routine is exited, and then later recalled after lengthening of the sampled signal by the addition of further audio input data from the microphone. Once the buffer contains a sufficient sampled signal length, the sampled signal is pulled from the buffer for further analysis, and a first subroutine 'DetectTOA' is called at step 102 for the purpose of detecting the time of arrival (TOA) for all pulses received from the transmitters in the sampled signal.

Figure 8:
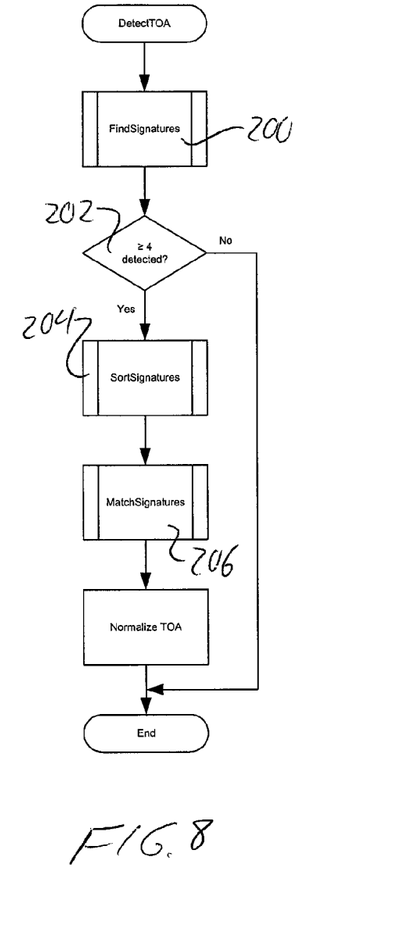
FIG. 8 schematically illustrates a portion of the process of FIG. 7 in greater detail, specifically a routine for detecting the time of arrival for the pulses from all the signal transmitters.

Turning to FIG. 8, the 'DetectTOA' subroutine starts a step 200 by calling another subroutine, referred to herein as 'FindSignatures', which is used to search the sampled signal for a signature representative of the expected form of the ultrasonic pulses from the transmitters.

Figure 9:
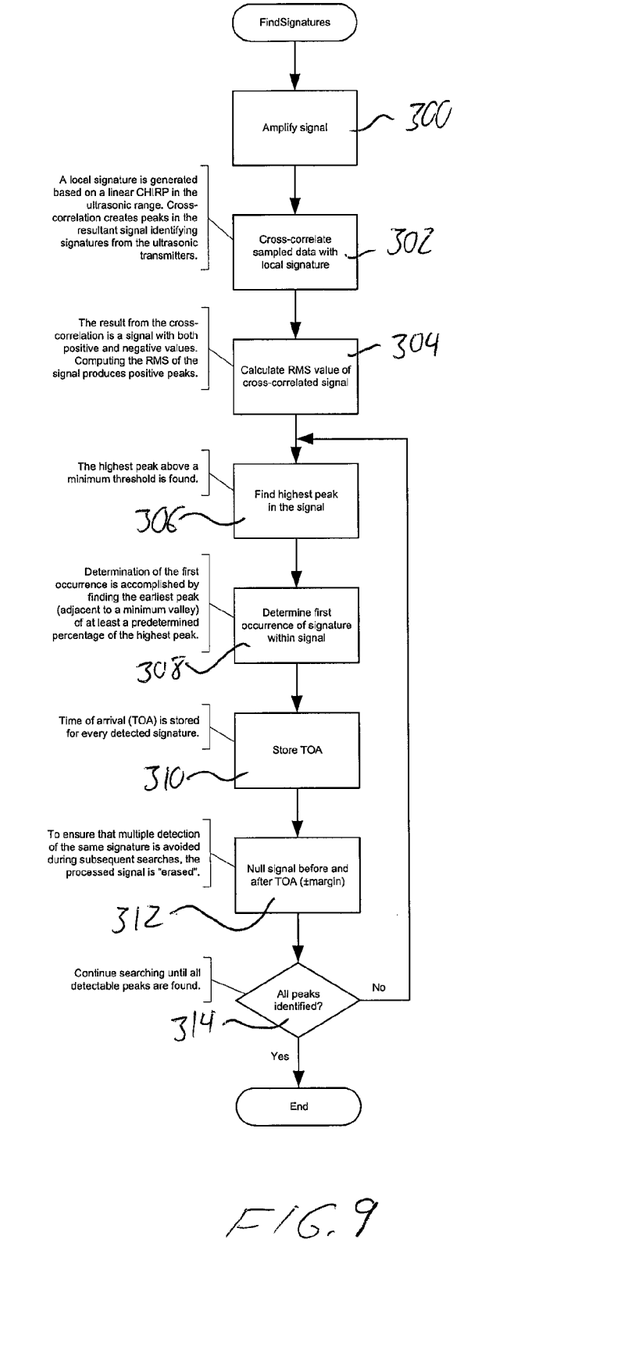
FIG. 9 schematically illustrates steps in the routine of FIG. 7 for discriminating the true time of arrival for each pulse from false positives, such as the reflection signal of FIG. 6, according to a method of the present invention.

Turning to FIG. 9, the 'FindSignatures' subroutine starts by amplifying the sampled signal at step 300, and then cross-correlates a local signature against the amplified sampled signal at step 302. The local signature is representative of a form or signature of the pulses expected at the mobile device from the transmitters of the system, whereby the cross-correlation function can be used to identify the received pulses within the amplified sampled signal. In the present embodiment, the ultrasonic transmitters are all configured to emit the same ultrasonic pulse signal, which may be a chirp pulse that is swept in frequency within the ultrasonic range, for example linearly swept from 18 kHz to 24 kHz with a Blackman-Harris envelope. Accordingly, a single cross-correlation function on a single copy of the sample data can be used to locate all of the transmitter pulses in the amplified sampled signal. In the present embodiment, the local signature used as a comparison signal for cross-correlation with the amplified sampled signal represented by the sample data is generated as part of the program, but other embodiments may store the local signature data instead of generating it anew each time the program is run.

After being cross-correlated with the local signature, further processing of the sampled signal continues by performing an RMS (root mean square) function on the cross-correlated signal at step 304, whereby all data points of the cross-correlated signal are now of positive magnitude. This simplifies the process for identifying which of the data points in the cross-correlated signal data represent peaks of the cross-correlated signal, and which represent valleys located between the peaks. In other embodiments, more complicated peak identification routines operable on data sets with both positive and negative data points may instead be used, thereby omitting the need for the RMS function or other function for converting the data values to an all-positive set. In yet other embodiments, other ways of converting the signal data to an all-positive data set may be used in place of an RMS function, for example adding offset values to the data points to effectively transpose the signal to an all positive set, although this again may introduce added complexity.

Figure 5:
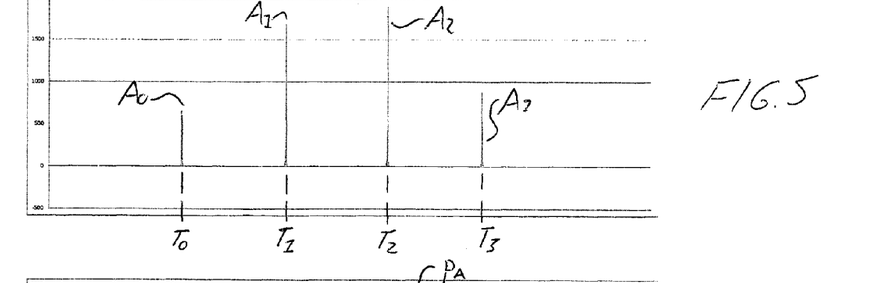
FIG. 5 illustrates a processed signal generated at the mobile device based from the sampled audio signal recorded by the mobile device.

FIG. 5 illustrates an example of the cross-correlated signal after the RMS function, where four notably peaked areas $A_0$, $A_1$, $A_2$, $A_3$ are clearly distinct from one another, being separated in time by regions of substantially zero amplitude. Each area thus represents a span of time in which a respective on of the pulses $P_0$, $P_1$, $P_2$, $P_3$ from the ultrasonic transmitters $UT_0$, $UT_1$, $UT_2$, $UT_3$ was received. The length of the interval between the emission of pulses from the transmitters and the size of the room in which the transmitters are installed and the layout of the transmitters are selected such that the travel time it will take for each pulse to reach any position in the room from the respective transmitter does not exceed the interval time between emission of sequential pulses. Accordingly, once one of the peaked areas is confirmed as a match for a respective one of the transmitters, the transmitters to which the remaining pulses in the sampled signal match up are automatically known.

However, as illustrated in FIG. 6, which shows a close-up view of area $A_1$, each peaked area in the signal may feature more than one prominent peak. In the illustrated example, the first prominent peak $p_A$ (first meaning earlier in time) marks the true arrival of the actual original pulse $P_1$ from transmitter $UT_1$, and the second prominent peak $p_B$ marks the arrival of a reflection of pulse $P_1$ at the mobile device. With two prominent peaks, comparison of the data point values of the peaks within an area against a fixed threshold value is not alone sufficient to accurately and confidently identify which of these two peaks represents the actual arrival time of the respective pulse. Also, automatically selecting the highest data point value among prominent peaks would not always guarantee a correct identification of the arrival time either, as constructive interference between two reflections of the original pulse could result in a greater magnitude than the peak marking the true arrival of the original pulse. Accordingly, the 'FindSignatures' routine includes steps for discerning between two prominent peaks that could otherwise lead to an incorrect selection of the true time of arrival peak.

Turning back to FIG. 9, this process begins by first locating the highest peak value, exceeding a predetermined static threshold value, in the entire sampled signal at step 306. This first static threshold value is used as a noise floor to rule out ambient noise from analysis-worthy signals, and thus is likewise considered against all other peaks in order to identify those that are 'selectable' for analysis in further steps of the process. In the next step 308, a second peak immediately adjacent the highest peak in the reverse direction of time (i.e. the neighbouring peak immediately preceding the highest peak in time) is selected (on the basis of exceeding the first threshold), and data value is compared against a second threshold value, which is calculated as a predetermined percentage, for example 10%, of the data value of the highest peak. If the magnitude of the second peak is less than the second threshold value, then the first peak (i.e. the highest peak) is confirmed as marking the true time of arrival of one of the pulses from the transmitters. On the other hand, if the second peak is greater than this second threshold value, then this step is repeated, meaning that a third peak immediately preceding the second peak is selected and compared against the second threshold value. If the third peak is greater than the threshold, this step repeats again, but if it is less than the second threshold, then the step is complete, and the second peak is confirmed as making the true time of arrive of one of the pulses from the transmitters. To summarize, step 308 requires finding the highest peak, and then moving back in time peak-to-adjacent-peak until a peak having a magnitude less than the second threshold is found, at which point the currently selected peak is discarded as a candidate for the true time of arrival, and the last selected peak before it (i.e. the peak located one peak ahead of the current peak in time) is confirmed as marking the true time of arrival of one of the pulses. Rather than running this peak by peak analysis over the full length of the signal pulled from the buffer, step 308 may employ time-based boundaries within which to search for the true time of arrival marker. For example, having located the maximum peak from which to the start the search, the search process may be limited to an area spanning a predetermined number of milliseconds back from the maximum peak.

At step 310, the time value of this peak is stored as a confirmed Time of Arrival for one of the pulses, although the system does not yet determined which pulse this Time of Arrival applies to.

If no peak exceeding the first threshold and preceding the first peak in time was found in the forgoing scan of the prescribed time range measured backward from the first peak, then the originally selected first peak is stored as the confirmed Time of Arrival. Similarly, if no peak of lesser magnitude than the threshold can be found when a starting point of a prescribed range of time measured back from the possible time of arrival is reached, than the last-selected threshold-exceeding peak, which has a magnitude value greater than the threshold, is stored as the confirmed Time of Arrival.

Moving on to step 312, the signal is amended to null out a span of time containing the peaks that were just analyzed in steps 306 and 308, thereby removing these peaks from further consideration under subsequent repetition of steps 306 to 312 to find the Time of Arrival for other pulses accounted for in the sampled signal. This portion of the signal to be nulled out may be calculated based on a number of pulse-lengths (i.e. a multiple of the pulse length determined from the local signature), for example nulling out one pulse-length before the confirmed TOA peak, and ten pulse-lengths after the confirmed TOA peak.

At step 314, a check is run to determine whether there are any peaks remaining in the signal that exceed the first threshold. If not, then the 'FindSignatures' subroutine is exited. If any such peaks do remain, then steps 306-314 are repeated.

To further illustrate the above described process of TOA determination, in the example of FIG. 5, area $A_2$ would have been analyzed in the first run of steps 306 to 314, as this area contains the highest peak of the entire sampled signal. Turning to FIG. 6, area $A_1$ would have been analyzed next, starting at peak PA, which would have been the highest peak after nulling out of area $A_2$. Peak $p_A$ has a magnitude of approximately 1700 on the illustrated scale of magnitude, meaning that the second threshold would have a value of approximately 170 (10% of 1700). Accordingly, the analysis would have selected and compared $p_C$, $p_D$, $p_E$, and $p_F$ against the second threshold before finding p6 to have a magnitude below 170, at which point $p_E$ would have been determined as the true point of arrival of a pulse at the mobile device.

Turning again to FIG. 8, once the 'findSignatures' subroutine is complete, the program returns to the 'DetectTOA' subroutine, and at step 202 checks whether the number of TOAs determined in the 'FindSignatures' routine is at least equal to the number of ultrasonic transmitters, of which there are four in the present embodiment. If the number of determined TOAs is less than four, then the DetectTOA' subroutine is exited. With brief reference to FIG. 7, step 104 of the 'Detect Position' routine repeats this check of whether at least four TOAs were determined, and if not, the routine is exited, as this indicates that not enough TOAs were determined from the analyzed signal from the buffer. Returning the number of TOAs detected from the DetectTOA subroutine to the higher level 'Detect Position' routine allows the detected number of TOAs to be used elsewhere in the program for additional purposes other than this check, if needed. The entire process starts over reverting back to step 100 to check whether the buffer contents are sufficient to pull a new signal to analyze.

Figure 10:
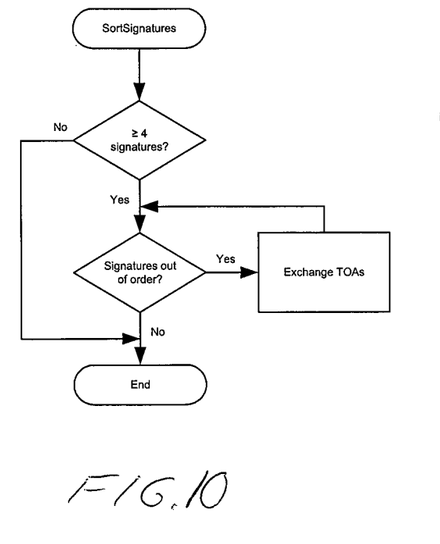
FIG. 10 schematically illustrates steps in the routine of FIG. 8 for sorting the true times of arrival determined in FIG. 9 into sequential order.

Turning back to FIG. 8, if the number of TOAs determined was four or greater, then the 'DetectTOA' subroutine instead continues on to step 204, calling a 'SortSignatures' subroutine. The TOAs determined in the 'FindSignatures' subroutine were found in order of descending peak magnitude, and consequently were not necessarily found and stored in order of ascending time values. Accordingly, as shown in FIG. 10, the 'SortSignatures' subroutine applies a conventional sort routine in order to sort the TOAs in sequential order (i.e. ascending time values).

The 'DetectTOA' subroutine then calls a 'MatchSignatures' subroutine at step 206, which is required in order to determine which of the determined TOAs matches up to which of the transmitters. Although the transmitters emit their respective pulses in a predetermined order, the sequence of pulses in the sampled signal being processed at any given time need not necessarily begin with pulse $P_0$ from transmitter $UT_0$. Accordingly, further action is required in order to match up the sorted TOAs with the respective transmitters. As mentioned above, a delay time of significantly greater length than the interval time I between pulses in the emission sequence is employed before repeating the sequence over again. Accordingly, the 'MatchSignatures' subroutine of FIG. 11 uses the determined TOAs to calculate whether there exits a gap between the detected signatures (i.e. a difference between two adjacent TOAs) that exceeds a predetermined length of time having a value somewhere between the values of the interval time and the delay time. This marks a gap of time between two pulse arrivals at the mobile device that notably exceeds the interval time, thus denoting that the first TOA after this gap marks the arrival of pulse $P_0$ from transmitter $UT_0$.

Figure 11:
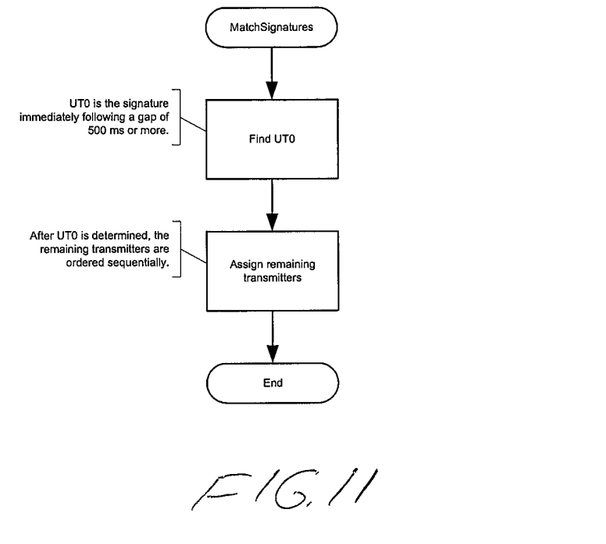
FIG. 11 schematically illustrates steps in the routine of FIG. 8 for matching the true times of arrival determined in FIG. 9 to the respective signal transmitters.

Having matched arrival time $T_0$ (the TOA of $P_0$) to transmitter $UT_0$, the remaining TOAs can be assigned to their respective transmitters based on the pulse emission sequence of the transmitters. That is, the next TOA sequentially following the TOA matched to $UT_0$ will mark the arrival of a pulse from $UT_1$. A previous TOA sequentially preceding the TOA matched to $UT_0$ will mark the arrival of a pulse from $UT_3$.

Figure 4:
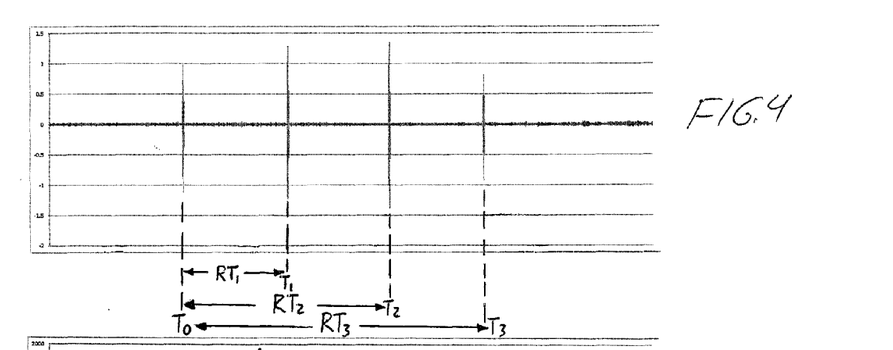
FIG. 4 illustrates a raw, unprocessed audio signal sampled by the mobile device to capture the arrival of the ultrasonic pulses from the signal transmitters at the mobile device.

With the 'DetectTOA' subroutine completed, having determined all TOAs accurately by distinguishing the true times of arrival of the original transmitter pulse signals from reflection of said pulse signals, the 'Detect Position' routine of FIG. 7 continues at step 106 by calling a 'GetRTOA' subroutine in order to determine the relative time of arrival from the transmitters using $T_0$ as the reference time. This is schematically shown in FIG. 4, where times $T_0$, $T_1$, $T_2$, $T_3$ refer to the determined TOAs for pulses $P_0$, $P_1$, $P_2$, $P_3$ from transmitters $UT_0$, $UT_1$, $UT_2$, $UT_3$. The RTOA for the master transmitter $UT_0$ is always zero. The RTOA for each slave transmitter is calculated as the respective TOA minus the arrival time $T_0$ of pulse $P_0$ from transmitter $UT_0$, minus the number of intervals between the emission time of the master transmitter $t_0$ and the emission time of the slave transmitter in question. Accordingly, the formula for RTOA can be expressed as $RT_n = T_n - T_0 - (I*n)$ where n>0. Accordingly, the RTOA for $P_1/UT_1$ is calculated as $RT_1 = T_1 - T_0 - I$, the RTOA for $P_2/UT_2$ is calculated as $RT_2 = T_2 - T_0 - 2I$, and the RTOA for $P_3/UT_3$ is calculated as $RT_3 = T_3 - T_0 - 3I$.

With these values, and the known positional data concerning the fixed, stationary locations of the four transmitters, the position of the mobile device can be calculated using known techniques. For example, the present embodiment, at step 108 of FIG. 7, uses the Bucher/Misra implementation of an algorithm for determining two possible positions in three dimensions using this information, and then at step 110 uses the region boundary and last known position of the mobile device to select the correct one of the two possible positions from step 108 as the final detected position of the mobile device. The region boundary refers to an area bound by the four transmitters or a slightly larger area or envelope containing the area bound by the four transmitters. With this boundary known, if one of the two possible positions determined by the Bucher/Misra algorithm falls outside the region boundary, it can be discarded, and the other possible position selected as the actual position of the mobile device.

Further details on the Bucher/Misra implementation for position determination based on the relative time of arrival the pulses from three transmitters relative to the arrival time of the pulse from a fourth transmitter can be found in "A synthesizable low power VHDL model of the exact solution of three dimensional hyperbolic positioning system" (Bucher, Ralph and D. Misra. VLSI Design, Volume 15 (2002), Issue 2, Pages 507-520), which makes further reference to "Simple solutions for a hyperbolic and related position fixes" (Fang, Bertrand T. IEEE Transactions on Aerospace and Electronic Systems, Volume 26 (1990), No. 5, Pages 748-753), both of which are incorporated herein by reference.

Use of the Bucher/Misra algorithm eliminates the need to sync the clock of the mobile device to the transmitters, as the calculations used for the final position determination do no rely upon knowledge of the emission time of the pulse signal from any transmitter. However, it will be appreciated that the 'DetectTOA' routine disclosed herein may also be used to advantage in systems or methods where the final determination of the mobile device's position using the TOAs of the pulses is calculated in another manner. For example, the 'DetectTOA' routine may be employed in known types of systems where the mobile device is synchronized to three or more transmitters, and thus the accurate TOA determination is subsequently used in a set of calculations where the travel time of the pulses is used together with a speed of sound value to calculate the distance of the mobile device from each transmitter, from which the mobile device's position can be solved. In other words, the benefit of the increased accuracy in the TOA determination process by discriminating the true time of arrival from reflections or other false readings may be employed regardless of how the determined TOAs are subsequently exploited.

Applicant's prototype system uses the display of the mobile telephone to show a map of the indoor area or environment being monitored, and a marker overlaid on the map to illustrate the mobile's devices current position in the indoor environment. As the determined position data is updated based on a newly analyzed signal, the marker is moved or repositioned on-screen, providing real-time feedback to the user of the mobile device on their current position. It will be appreciated that other embodiments may additionally or alternatively employ the output data from the position determination process for other purposes, for example forwarding the continually updating position data to an offsite server via a network, e.g. the internet, for further processing or use. User-carried mobile devices other than a mobile phone may be tracked, for example including tablet computers with a suitable microphone for detecting the ultrasonic signals.

In the prototype, the installed positions of the transmitters are entered into a user-settings area of the user-interface of the software using the phone's input device, and stored for use in the position determination calculations. However, other embodiments employ a server on which the map and transmitter location data is stored, and the phone software is configured to connect the phone the server, for example by way of the radio transceiver 13, to retrieve this data as the user enters or approaches the area or environment in which the transmitters are installed. The server functionality of storing the map and transmitter location data and transmitting same to the mobile phone may be incorporated into set of transmitters.

Also, although the detailed embodiment above uses ultrasonic acoustic pulses to determine the position of a mobile phone, as employed in Applicant's prototype, the advantageous TOA determination process may employed in positioning systems using other forms of energy for the pulsed positioning signals emitted by the transmitters and detected by the mobile device (e.g. infrared energy, optical or light signals, electromagnetic signals, mechanical vibrations through various mediums, etc.), and in positioning systems using a mobile device other than a mobile telephone. For example, although the detailed embodiment is described in the context of determining the position of a person in an indoor environment by using ultrasonic sound waves or vibrations travelling through air, a positioning system using the advantageous TOA determination process in identifying the position of a device may use signals in the form of mechanical vibrations moving through other mediums, whether liquid (e.g. water), gaseous, or even solid (e.g. rock), provided suitable transducers for the type of emitted signal energy and signal-conveying medium are used. For example, a series of transmitters installed on walls of a mineshaft could emit signals into the surrounding rock, and an electronic device fed down the shaft can be temporarily attached or abutted against the mine shaft wall to receive vibrations from the transmitters, and use the arrival times to determine the current location (i.e. depth) of the device along the shaft.

Additionally, although disclosed in the context of a system in which the mobile device being positionally tracked is the receiver and a series of satellite devices installed at predetermined positions in the indoor environment are the transmitters, the advantageous TOA determination process can be used in the other type of system mentioned in the background section above, where the mobile device emits a signal, whose times of arrival at the different satellites are determined, and used in calculated the mobile device's position. The TOA determination process at each satellite thus improves in accuracy through the present invention's method of distinguishing the true time of arrival from possible false positives.

Furthermore, while the detailed embodiment employs use of an identical chirp signal from the transmitters, and relies on time separation of the signal emissions from the transmitter to allow determination of the source of each signal, other embodiments may employ the emission of unique signals from the different transmitters. In one such embodiment, the transmitters may emit Pseudo Random Noise (PRN) or Pseudo Random Code (PRC) signals that are each unique to a particular one of the transmitters, and that are each known to the mobile device for use a respective local signature for a respective cross-correlation of the amplified sample to detect the signal from the particular transmitter. In such embodiments where unique signals identifiable by the mobile device are emitted by the transmitters, the emission of the signals from the transmitters need not necessarily be spaced apart in time.

Since various modifications can be made in the present invention as herein above described, and many apparently widely different embodiments of same made within the scope of the claims without department from such scope, it

The invention claimed is:

1. Method of processing positioning signals in a positioning system employing a series of signal transmitters arranged at predetermined locations to emit respective energy pulses and an electronic device detecting arrival times of said pulses for use in determining a position of the electronic device, the method comprising:
   (a) obtaining a sampled signal by sampling an incoming signal at the electronic device over a time period;
   (b) determining a correlated signal by correlating the sampled signal with a comparison signal representing a form of the energy pulses expected at the electronic device; and
   (c) locating and selecting a peak in the correlated signal representing a possible time of arrival of the energy pulse from one of the signal transmitters at the electronic device;
   (d) from the peak selected in step (c), scanning the correlated signal in a reverse direction of time for sequentially preceding peaks until either (i) a located and selected preceding peak has a magnitude less than a threshold, or (ii) a starting point of a prescribed range of time measured back from the possible time of arrival is reached; and
   (e) identifying a last-selected threshold-exceeding peak, which has a magnitude value greater than the threshold, as an indication of a true time of arrival of the energy pulse from the one of the signal transmitters at the electronic device.

2. The method of claim 1 further comprising an additional step of removing a portion of the correlated signal that contains the indication of the true time of arrival from further consideration and then repeating steps (c) to (e) by a number of times at least as great in number as a quantity of signal transmitters in the set minus one, so that a number of the energy pulses for which the true time of arrival was determined is at least as great as the quantity of signal transmitters.

3. The method of claim 2 wherein the peak located in step (c) is a peak of highest magnitude in the signal, and the method further comprises an additional step of sorting the true times of arrival in order of time.

4. The method of claim 3 further comprising an additional step of matching each true time of arrival to a respective one of the signal transmitters.

5. The method of claim 4 wherein the signal transmitters are arranged to emit the respective energy pulses at emission times of predetermined intervals in a predetermined sequence and to have a time delay of greater length than each interval in the series before restarting the sequence after emission of the energy pulse from a last signal transmitter in the sequence, and the time period in step (a) is at least as long as the sum of the intervals between the energy pulses emitted by the signal transmitters, and wherein the additional step of matching each true time of arrival comprises determining which true time of arrival matches a first one of the signal transmitters by searching for a time gap between a sequential pair of true arrival times that exceeds the length of the time delay, whereby the existence of such a gap acts to identify a later one of the sequential pair of the true times of arrival as a match for the energy pulse of a first signal transmitter in the sequence.

6. The method of claim 2 further comprising using the true times of arrival together with known positional data on the locations of the signal transmitters to calculate a position of the electronic device.

7. The method of claim 1 wherein step (b) further comprises performing an RMS function on the correlated signal prior to step (c) in order to eliminate negative values from the correlated signal.

8. The method of claim 1 wherein the threshold in step (d) is calculated as a percentage of the magnitude value of the peak selected in step (c).

9. The method of claim 1 wherein each signal transmitter is an acoustic signal transmitter and each energy pulse is an acoustic pulse.

10. The method of claim 1 wherein each signal transmitter is an ultrasonic signal transmitter and each energy pulse is an ultrasonic pulse.

11. The method of claim 1 wherein the electronic device comprises a user-carried mobile device.

12. The method of claim 11 wherein the user-carried mobile device comprises a mobile telephone.

13. The method of claim 1 wherein the transmitters are installed in an indoor, air-filled environment in which air defines a transmission medium through the energy pulses are conveyed.

14. The method of claim 1 wherein the transmitters are arranged to transmit the energy pulses through a liquid medium in which the electronic device is to be located.

15. The method of claim 1 wherein the transmitters are arranged to transmit the energy pulses through a solid medium.

16. The method of claim 1 wherein step (b) comprises cross-correlating the sampled signal with the comparison signal.

17. A non-transitory, computer-readable memory having stored thereon statements and instructions for execution by a processor to perform the method according to claim 1 when said statements and instructions are executed by the processor.

18. Method of processing positioning signals in a positioning system employing energy pulses transmitted and received by opposite ones of a series of satellites installed at predetermined locations and an electronic device to be located in order to use detected arrival times of the energy pulse signals for use in determining a position of the electronic device, the method comprising:
   (a) obtaining a sampled signal by sampling an incoming signal at either the electronic device or the series of satellites, said incoming signal including arrival of an energy pulse emitted by a transmitter of the other of the electronic device or the series of satellites;
   (b) determining a correlated signal by correlating the sampled signal with a comparison signal representing a form of the energy pulse expected from the transmitter;
   (c) locating and selecting a peak in the correlated signal representing a possible time of arrival of the energy pulse from the transmitter;
   (d) from the peak selected in step (c), scanning the correlated signal in a reverse direction of time for sequentially preceding peaks until either (i) a located and selected preceding peak has a magnitude less than a threshold, or (ii) a starting point of a prescribed range of time measured back from the possible time of arrival is reached; and (e) identifying a last-selected threshold-exceeding peak, which has a magnitude value greater than the threshold, as an indication of a true time of arrival of the energy pulse from the transmitter.

19. The method of claim 18 further comprising, from among a plurality of peaks in the correlated signal each representing a possible time of arrival of the energy pulse from the transmitter, discerning a one of said peaks that represents a true arrival of the energy pulse from the transmitter from another of said peaks that represents arrival of a reflected energy pulse.

* * * * *